No. 780,290. Patented January 17, 1905.

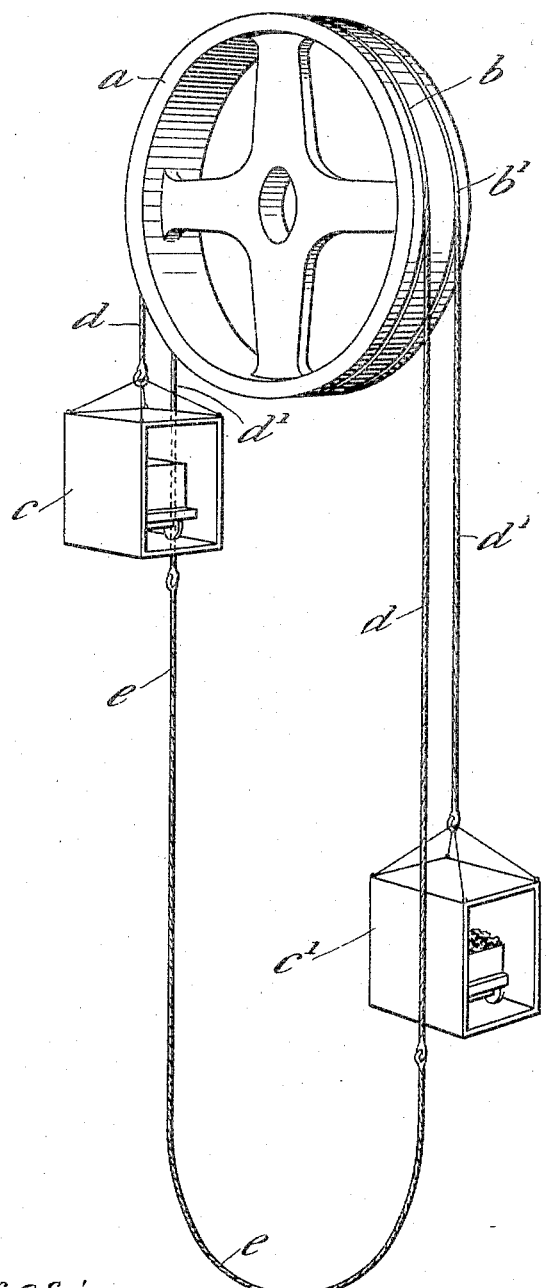

UNITED STATES PATENT OFFICE.

ALFRED AUSTIN HOPKINSON, OF MANCHESTER, ENGLAND.

HOISTING APPARATUS.

SPECIFICATION forming part of Letters Patent No. 780,290, dated January 17, 1905.

Application filed April 18, 1904. Serial No. 203,794.

*To all whom it may concern:*

Be it known that I, ALFRED AUSTIN HOPKINSON, engineer, a subject of the King of Great Britain and Ireland, residing at Salford Iron Works, Manchester, in the county of Lancaster, England, have invented certain new and useful Improvements in Hoisting Apparatus, of which the following is a specification, for which I have applied for a patent in Great Britain, filed March 7, 1904, No. 5,590.

This invention relates to hoisting apparatus for raising loads vertically, and is particularly applicable for use in mine-shafts or like cases in which the load is raised in cages or skips or other contrivances connected in such a manner that the loaded cage ascends while the empty cage descends.

The invention is illustrated in the accompanying drawing, which is a perspective view showing diagrammatically the essential elements of an apparatus constructed according to the present invention.

A pulley $a$, which may be driven by any suitable means, has two peripheral grooves $b$ $b'$, which are made of suitable form and material for retaining in position and driving the ropes or chains or the like to which the loads are attached. The cages $c$ $c'$ are suspended from the ends of hoisting-ropes $d$ $d'$, which pass over the two grooves $b$ $b'$, respectively, in opposite directions, and have their free ends joined by means of a balance-rope $e$, which hangs in a bight reaching nearly to the bottom of the shaft or loading position and which is preferably heavier length for length than the two hoisting-ropes $d$ $d'$ together, so that the loaded cage may be more effectually balanced.

The two hoisting-ropes and the balance-rope are each arranged to be practically equal in length to the shaft, so that when the cages are in the positions shown in the drawing practically the whole of the balance-rope hangs from the same side of the pulley as the empty cage.

The pulley $a$ may be placed vertically over the shaft or in any other convenient position and the ropes passed over suitably-placed guide-pulleys.

The bight of the balance-rope may hang loose, as shown in the drawing, or may pass round a pulley adjustable in position vertically, so as to take up any slack due to stretching of the ropes.

On rotating the pulley $a$ the friction of the ropes $d$ $d'$ in the grooves $b$ $b'$ will cause the cage $c$ to descend and the cage $c'$ to ascend, the weight of the ropes being partly or completely balanced, and if the balance-rope $e$ be made heavier than the two hoisting-ropes together length for length the load on cage $c'$ may also be partly, completely, or more than completely counterbalanced at the commencement of the operation. When the loaded cage $c'$ has been raised, the load is taken therefrom and another load placed in the cage $c$, and the pulley $a$ is rotated in the opposite direction, and so on alternately in either direction.

Having thus described the nature of this invention and the best means I know of carrying the same into practical effect, I claim—

1. Hoisting apparatus comprising a grooved pulley and a hoisting-rope adapted to engage in the said grooves and passing twice over the said pulley, the intermediate part of the said rope hanging in a loose bight, substantially as described.

2. Hoisting apparatus comprising a grooved pulley, a pair of hoisting-ropes adapted to engage in the said grooves, and a balance-rope joining the free ends of the said hoisting-ropes, substantially as described.

3. Hoisting apparatus comprising a pulley and a hoisting-rope passing over the said pulley and arranged to simultaneously wind and unwind thereon, the intermediate part of said hoisting-rope hanging in a loose bight, substantially as described.

4. Hoisting apparatus comprising a pulley, a pair of hoisting-ropes passing over the said pulley and arranged to be respectively wound and unwound simultaneously and a balance-rope joining the free ends of the said hoisting-ropes, substantially as described.

5. Hoisting apparatus comprising a pulley having two circumferential grooves a pair of hoisting-ropes engaging in said grooves, each with each, and a balance-rope joining one end of one of the hoisting-ropes with that end of the other hoisting-rope which hangs from the opposite side of the pulley, substantially as described.

6. Hoisting apparatus comprising a grooved pulley, a pair of hoisting-ropes, and a balance-rope joining the free ends of the said hoisting-ropes, and hanging in a loose bight, substantially as herein described.

In testimony whereof I have signed my name to this specification in the presence of two subscribing witnesses.

ALFRED AUSTIN HOPKINSON.

Witnesses:
   THOMAS WARD,
   JAS. STEWART BRADFORD